Nov. 29, 1960 E. R. NIELSEN 2,962,061
CHAIN SAW SUPPORTING AND GUIDE BAR
Filed June 20, 1958
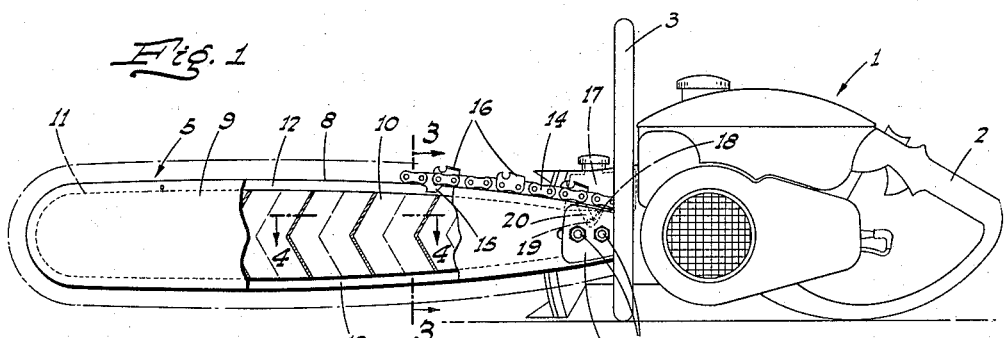
INVENTOR.
Erick R. Nielsen
BY
Webster & Webster
ATTYS.

United States Patent Office 2,962,061
Patented Nov. 29, 1960

2,962,061

CHAIN SAW SUPPORTING AND GUIDE BAR

Erick R. Nielsen, 2404 N. Wilson Way, Stockton, Calif.

Filed June 20, 1958, Ser. No. 743,414

1 Claim. (Cl. 143—32)

The present invention relates in general to an improvement in portable or hand manipulated, engine driven chain saws.

In such type of saw the endless cutter chain runs on—and travels about—an elongated, forwardly projecting, supporting and guide bar; the latter having a peripheral channel into which fins on the chain project in guided relation.

The chain, including such fins, is conventionally lubricated by the feeding of oil onto such chain and into the guide channel solely at the lead end of the upper course of the latter, and at which end the chain initially begins its travel on the supporting and guide bar; the intention being that the chain will distribute the oil all along the length of said guide channel, including the lower course thereof.

However, in actual practice much of the oil is lost or thrown off at the rounded front end of the bar as the chain turns thereabout, and as a result there is a tendency for the lower course of the guide channel and the corresponding run of the chain to starve for oil, which causes undue friction and wear.

It is therefore the major object of this invention to provide effective lubrication of the lower run of the chain and the corresponding course of the guide channel, while retaining the conventional introduction of the oil solely onto the chain and into the guide channel at the lead end of the upper course of the latter. The desired result is accomplished by the inclusion in the bar of a plurality of longitudinally spaced ducts which communicate, for oil flow, between the upper course and the lower course of said guide channel, whereby a portion of the oil as distributed along said upper course is received in such ducts and thence transfers to the lower course of the guide channel to effectively lubricate the latter, together with the lower run of the chain.

Another important object of the invention is to provide a chain supporting and guide bar of novel laminated construction, and wherein the laminae when assembled form, without more, the oil flow ducts which extend between the upper course and the lower course of the guide channel.

It is also an object of the invention to provide a chain supporting and guide bar—constructed as above, and for the purpose described—which is designed for ease and economy of manufacture; for ready installation on existing chain saws without otherwise altering or modifying the same; and long service, with wear on the chain reduced to a minimum by reason of adequate lubrication throughout the length of the latter.

Still another object of the invention is to provide a practical, reliable, and durable chain saw supporting and guide bar, and one which will be exceedingly effective for the purpose for which it is designed.

These objects are accomplished by means of such structure and relative arrangement of parts as will fully appear by a perusal of the following specification and claim.

In the drawings:

Fig. 1 is a side elevation of a chain saw fitted with my improved chain supporting and guide bar; the latter being shown partly broken away and partly in section.

Fig. 2 is an enlarged fragmentary side elevation showing the rear portion of the bar, detached.

Fig. 3 is an enlarged transverse section on line 3—3 of Fig. 1.

Fig. 4 is an enlarged fragmentary sectional plan view taken on line 4—4 of Fig. 1.

Fig. 5 is a fragmentary side elevation, partly broken away and partly in section, of a modified form of the chain supporting and guide bar, detached.

Fig. 6 is an enlarged transverse section on line 6—6 of Fig. 5; the view showing the chain as engaged with said bar.

Fig. 7 is an enlarged fragmentary sectional plan view taken on line 7—7 of Fig. 5.

Referring now more particularly to the characters of reference on the drawings, and at present to the embodiment of Figs. 1–4 inclusive, the numeral 1 indicates generally the conventional engine and drive unit of a portable chain saw; such unit including a rear handle 2, a forward handle 3, and a mounting or attachment block 4 which projects forwardly from said unit 1.

The numeral 5 indicates a longitudinally projecting saw chain supporting and guide bar generally; such bar embodying the present invention but being conventionally formed at the rear with a longitudinally open-ended slot 6. Such slot 6 provides for the securing of the bar 5 at its rear end to the mounting or attachment block 4, and which is accomplished by bolts 7 on said block, and which bolts pass through the slot 6 in clamping relation to the rear end of the bar.

The bar 5 is of laminated sheet metal construction and comprises matching outer or side plates 8 and 9, and an intermediate or spacer plate 10; such plates being stiff and suitably secured together, as by sweating or spot-welding.

The intermediate or spacer plate 10, while symmetrical to the outer or side plates 8 and 9, terminates at its edge short of the periphery of the bar, whereby to provide—along the top, rounded front, and bottom of the latter—a guide channel 11 whose upper and lower courses are indicated at 12 and 13, respectively.

As usual, the chain saw includes a continuous cutter chain 14 which extends all about and rides on the periphery of the bar 5; such chain including—at longitudinally spaced points—inwardly extending guide fins 15 which run in the channel 11, and outwardly projecting cutter teeth 16. At the rear end thereof, and within the confines of the engine and drive unit 1, the chain 14 is trained about and driven by a sprocket (not shown).

The engine and drive unit 1 includes a tank 17 adapted to contain lubricating oil, and oil from such tank is fed under pressure—by conventional means (not shown) in the unit 1—to a passage 18 in block 4, and which passage communicates with a port 19 in the upper rear portion of the bar 5. From the port 19 the oil force-feeds through a passage 20 in said bar 5 into the upper course 12, of channel 11, adjacent its rear or lead end, and onto the chain at such point. From such point the fins 15 sweep the oil forwardly in said upper course 12.

The intermediate or spacer plate 10 is vertically but shallowly corrugated; the corrugations being indicated at 21, and each—in side elevation—being of herringbone form with the apex foremost, as shown. Such corrugations 17 thus define a plurality of vertical ducts 22 within the supporting bar 5 along the length thereof, with such ducts disposed alternately on opposite sides of the intermediate or spacer plate 10 and in communication between the upper course 12 and the lower course 13 of the guide channel 11. The purpose of the ducts 18 is to transfer lubricating oil—as swept along by fins 15—from said upper course 12 to the lower course 13 of the guide channel 11. In this way the lower course 13 of guide channel 11, and the lower run of the chain 14, are properly and effectively lubricated, preventing undue friction and wear, and where it otherwise frequently occurs.

Further, as each corrugation 21, and consequently the corresponding duct 22, is—inside elevation—of herringbone configuration, with the apex foremost, the upper half of each duct inclines rearwardly and upwardly to better receive oil from the upper course 12 of the guide channel, and the lower half inclines downwardly and rearwardly to more effectively deliver the oil to said lower course 13 of such channel.

Figs. 5-7 inclusive illustrative a modification of the invention; the bar here being indicated generally at 23, and comprising side plates 24 and 25 disposed in slightly spaced-apart relation, whereby at the periphery of such bar to form a guide channel 26 whose upper course and lower course are indicated at 27 and 28, respectively.

Intermediate such upper course 27 and lower course 28 of the guide channel 26 the side plates 24 and 25 each include a multiplicity of vertical, longitudinally spaced, inwardly deformed, panels 29 of relatively narrow width as compared to their height. Corresponding ones of the panels 29 abut in matching face to face relation, and are suitably secured together, as by sweating or spot-welding.

With the above construction of the bar 23 there is formed therein, between adjacent pairs of the abutting panels 29, vertical ducts 30 which extend between—and communicate at the ends with—the upper course 27 and the lower course 28 of said guide channel 26.

The guide bar 23 carries the cutter chain 31 on its periphery in the same manner described in connection with the embodiment of Figs. 1-4 inclusive; such cutter chain 31 including guide fins 32 which extend into the guide channel 26 ot maintain the chain 31 in guided relation on the periphery of the bar 23.

Just as in the previous embodiment, oil is force-fed into the rear or lead end of the upper course 27 of guide channel 26; a portion of such oil as swept forward in said upper course 27 by the guide fins 32 being received in the ducts 30, and thence transferred to the lower course 28 in order to adequately lubricate the latter, together with the corresponding or lower run of the cutter chain 31.

It will thus be recognized that the present embodiment of the invention has the same purpose, and functions in generally the same manner, as the embodiment of Figs. 1-4, yet with the bar 23 being of somewhat simplified construction in that no intermediate or spacer plate is required between the side plates 24 and 25.

From the foregoing description it will be readily seen that there has been produced such a device as will substantialy fulfill the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention the following is claimed as new and useful, and upon which Letters Patent are desired:

A chain saw supporting and guide bar including longitudinally extending side plates disposed in matching face to face relation, the edge portions of the side plates being transversely spaced to form a peripheral guide channel having an upper course and a lower course, each side plate being formed with a plurality of longitudinally spaced laterally inwardly deformed panels which extend between said courses of the channel, corresponding panels of the side plates abutting in matching relation, transversely spaced portions of the side plates between adjacent abutting panels defining oil transfer passages which communicate at corresponding ends with said upper and lower courses of the channel, the periphery of the bar being adapted to support a driven cutter chain provided with fins extending into said channel, and said bar being formed with oil-feed passage means discharging into said upper course of the channel at a point rearwardly of the oil transfer passages and from exteriorly of the bar whereby said fins upon advance thereof in said upper course sweep oil from such point to said oil transfer passages.

References Cited in the file of this patent
UNITED STATES PATENTS

| | | |
|---|---|---|
| 830,860 | Smith | Sept. 11, 1906 |
| 2,184,461 | Mall | Dec. 26, 1939 |
| 2,660,204 | Rosenboon | Nov. 24, 1953 |
| 2,748,810 | Strunk | June 5, 1956 |
| 2,765,823 | Kneifl | Oct. 9, 1956 |

FOREIGN PATENTS

| | | |
|---|---|---|
| 908,296 | Germany | Apr. 5, 1954 |